United States Patent
Singh

(10) Patent No.: US 11,658,957 B2
(45) Date of Patent: May 23, 2023

(54) METHODS AND APPARATUSES FOR TEMPORARY SESSION AUTHENTICATION AND GOVERNOR LIMITS MANAGEMENT

(71) Applicant: salesforce.com, inc., San Francisco, CA (US)

(72) Inventor: Prabhjot Singh, Union City, CA (US)

(73) Assignee: salesforce.com, inc., San Francisco, CA (US)

( * ) Notice: Subject to any disclaimer, the term of this patent is extended or adjusted under 35 U.S.C. 154(b) by 183 days.

(21) Appl. No.: 16/949,292

(22) Filed: Oct. 23, 2020

(65) Prior Publication Data

US 2022/0131851 A1    Apr. 28, 2022

(51) Int. Cl.
| | | |
|---|---|---|
| *H04L 29/06* | (2006.01) | |
| *H04L 9/32* | (2006.01) | |
| *H04L 9/40* | (2022.01) | |

(52) U.S. Cl.
CPC ........ *H04L 63/0807* (2013.01); *H04L 9/3247* (2013.01); *H04L 63/101* (2013.01); *H04L 63/105* (2013.01)

(58) Field of Classification Search
CPC . H04L 63/0807; H04L 9/3247; H04L 63/101; H04L 63/105
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |

(Continued)

*Primary Examiner* — Yonas A Bayou

(74) *Attorney, Agent, or Firm* — LKGlobal | Lorenz & Kopf LLP

(57) ABSTRACT

Methods, and apparatuses are provided for access limitations to a network in a session using a formatted web token. The method includes: formatting a web token by a schema to create a formatted web token for user access to the network; receiving a log-in request for the user access to the network server via an app hosted by a computing device remotely located to the network server; in response to receipt of a user access request, creating the session by the network server with network limitations for user access to data and resources of the network; passing the formatted web token to a client for enabling user access to the data and resources of the network; decoding payload data of the formatted web token at the client to authenticate the user access; and enabling the client with access limitations based on decoded payload data.

19 Claims, 4 Drawing Sheets

(56) References Cited

U.S. PATENT DOCUMENTS

| | | |
|---|---|---|
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,992,680 B2 * | 4/2021 | Hede .................. H04W 12/084 |
| 11,140,169 B1 * | 10/2021 | Hamel ............... H04L 63/0815 |
| 11,411,925 B2 * | 8/2022 | Kumar ............... H04W 12/086 |
| 11,502,839 B1 * | 11/2022 | Sundar ................. H04L 9/0861 |
| 11,516,671 B2 * | 11/2022 | Rajput ................. H04W 64/00 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2019/0306138 A1 * | 10/2019 | Carru ...................... H04L 63/08 |
| 2020/0007531 A1 * | 1/2020 | Koottayi ............... H04L 67/146 |
| 2020/0045140 A1 * | 2/2020 | Khemani ............ H04L 63/0807 |
| 2020/0059360 A1 * | 2/2020 | Martynov ............... H04L 63/08 |
| 2020/0099691 A1 * | 3/2020 | Akselrod ............... H04L 63/083 |
| 2020/0125700 A1 * | 4/2020 | Chang .................. G06F 21/6218 |
| 2021/0234706 A1 * | 7/2021 | Nair ...................... H04L 9/3213 |

* cited by examiner

METHODS AND APPARATUSES FOR TEMPORARY SESSION AUTHENTICATION AND GOVERNOR LIMITS MANAGEMENT

TECHNICAL FIELD

Embodiments of the subject matter described herein relate generally to an access management service, and more particularly, embodiments of the subject matter relate to a method and apparatus to configure client access remotely in a temporary session using a JavaScript Object Notation (JSON) Web Token (JWT) where remote access to data and resources of a network is limited based on information contained in JSON payloads stored at the client.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

With remote working environments becoming more widespread, users often find themselves in need to access network platforms at locations that are transient in nature and allow multiple user access. For example, a user may want to access the network platform from a hotel room using the display device in the hotel room. In such instances, the user requires a temporary session type access that enables includes an authentication process to ensure the user has the required authorization to access the network platform. Additional controls are desired to allow the resources and data that the user can access on the network platform in the temporary session for better resource and data network management in a more public remote environment and access location.

Furthermore, other desirable features and characteristics will become apparent from the subsequent detailed description and the appended claims, taken in conjunction with the accompanying drawings and the foregoing technical field and background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
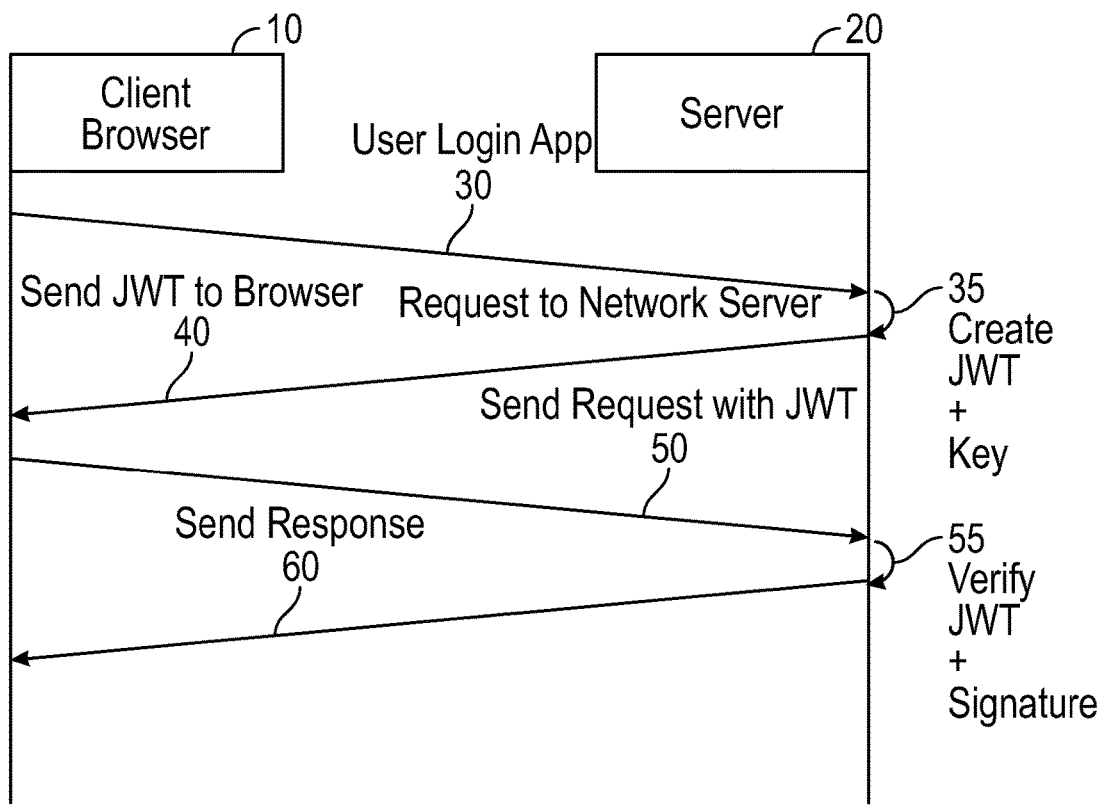
FIG. 1 illustrates an exemplary flow diagram of requests and responses using a token of a JavaScript Object Notation (JSON) web token (JWT) user access system in accordance with an embodiment.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

Today many enterprises now use cloud-based computing platforms that allow services and data to be accessed over the Internet (or via other networks). Infrastructure providers of these cloud-based computing platforms offer network-based processing systems that often support multiple enterprises (or tenants) using common computer hardware and data storage. This "cloud" computing model allows applications to be provided over a platform "as a service" supplied by the infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security, and other logistics in support of dedicated server hardware.

Multi-tenant cloud-based architectures have been developed to improve collaboration, integration, and community-based cooperation between customer tenants without compromising data security. Generally speaking, multi-tenancy refers to a system where a single hardware and software platform simultaneously supports multiple organizations or tenants from a common data storage element (also referred to as a "multi-tenant database"). The multi-tenant design provides several advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture, therefore, allows convenient and cost-effective sharing of similar application feature software between multiple sets of users.

It is contemplated that embodiments and their implementations are not merely limited to multi-tenant database system ("MTDBS") and can be used in other environment, such as a client-server system, a mobile device, a personal computer ("PC"), a web services environment, etc. However, for the sake of brevity and clarity, throughout this document, embodiments are described with respect to a multi-tenant database system, such as SALESFORCE-.COM®, which is to be regarded as an example of an on-demand services environment. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Various exemplary embodiments are described implementing a JavaScript Object Notation (JSON) Web Token (JWT); however it should be understood that the use of a JWT is an exemplary token, and any structured or formatted web token can be implemented. That is, any object that defines a compact and self-contained way for securely transmitting information between parties can be used to pass access limitations to various users, clients, etc.. Also, various frameworks (i.e., exemplary sequences of requests and responses, and formats for token requests) can be implemented that include an OAuth grant to request and dispense tokens.

The use of password-based authentication has become more susceptible to compromise. In order to enhance security to prevent network intrusions, other network tools that have employed processes include interview-based authentication in an attempt to eliminate authentication vulnerabilities. Also, various service providers users have also implemented to log in processes without a password, often by sending a temporal one-time-passwords over email or SMS to the end-user when the user tries to log in. For example, such a password-less authentication can include touch identification, push notifications, one-time passcodes, etc. Nevertheless, even with such enhancements, shortcomings still result in network breaches.

Hence, the user requires a higher level of security than presented often in temporal storage access via a client browser. For example, a more secure schema that is directed to sending requests by clients to servers for session identification and then having verified the user request and temporally stored the session ID cookie in a browser for access to a remote app session. Often when using the temporal storage of the client and need required for verifying at the network server, the security communication requests may be subject to security breaches.

The user of the REST (Representational State Transfer) based architecture with JWT can provide enhanced security for client-server applications. In this instance, the JWTs (JavaScript Object Notation Web Token) is used for authentication of subsequent client requests without needing to make frequent calls to the network server or database.

In various exemplary embodiments, the present disclosure describes systems and methods that implement a JWT for authorization that can enable a once logged in user to have access to routes, services, and resources that are permitted on the network with the token. This is because any subsequent request can include the JWT, rather than having to ping the network each time for authentication. The JavaScript Object Notation (JSON) Web Tokens can be enabled for secure transmission information between parties once the JWT authenticates the sender, i.e., the source, and verifies that the content has not been tampered with.

In various exemplary embodiments, the present disclosure describes systems and methods that enable creating a temporary session for network access by implementing the use of a JSON Web Token (JWT). The process can include sending a request by the client to a network server when a user logs in at the client found on a display device at a location remote to the network, creating a temporary session by an application at a network server for access to the network by a client to data and resources of the network server in the temporary session. The temporary session for network access was formulated in part on data from a JSON payload created by a JSON schema at the network server and stored at the client.

FIG. 1 is a flow diagram that is a flow diagram for a JWT request between a client and a server. The user at step 30, log-ins to the app and requests a session. The user log-in request is sent from the client 10 to the server 20. At the server 20, a JWT web token 35 is created with a security key. At step 40, the JWT web token 35 is sent to the client to initiate the session. The client stores at a browser the JSON web token. The JSON web token, or JWT ("jot") for short, is a standardized, optionally validated, and/or encrypted container format that is used to securely transfer information between the client 10 and the server 20. The JWT is a standardized tripartite configured with a header, payload, and signature token structure that is encoded in a compact JSON serialization format (using Base64-URL) that consists of a JSON Web Signature (JWS) and a JSON Web Encryption (JWE). Both serializations use different keys for signature and encryption. The session ID, etc.. is stored at the client 10 in the payload of the JWT web token 35. The client sends at step 50, a request to the server. The server 20 verifies the JWT signature. The server 20 is not required to perform a lookup procedure to validate the user (i.e., to lookup the user information) but only has to verify the signature of the web token.

The user information is stored in the JWT web token 35, so the server does not have to recall the user ID, session ID, etc.. The JWT web token 35 three distinct parts, the header, the payload, and the verify signature are used in the authentication process and to configure the access by the client. The header portion of the JWT is directed to identifying an algorithm that is used to encode and decode the JSON payload. The signature is used to verify at step 55 that the token has not been tampered with or changed. In various exemplary embodiments, in JSON Web Token (JWT) is used as an authentication mechanism formatted with a set of API resources that are required for access by the client to the API resources. The client can be configured to store the JWT for keeping user credentials and authentication tokens (JWTs) secure.

Figure 2:
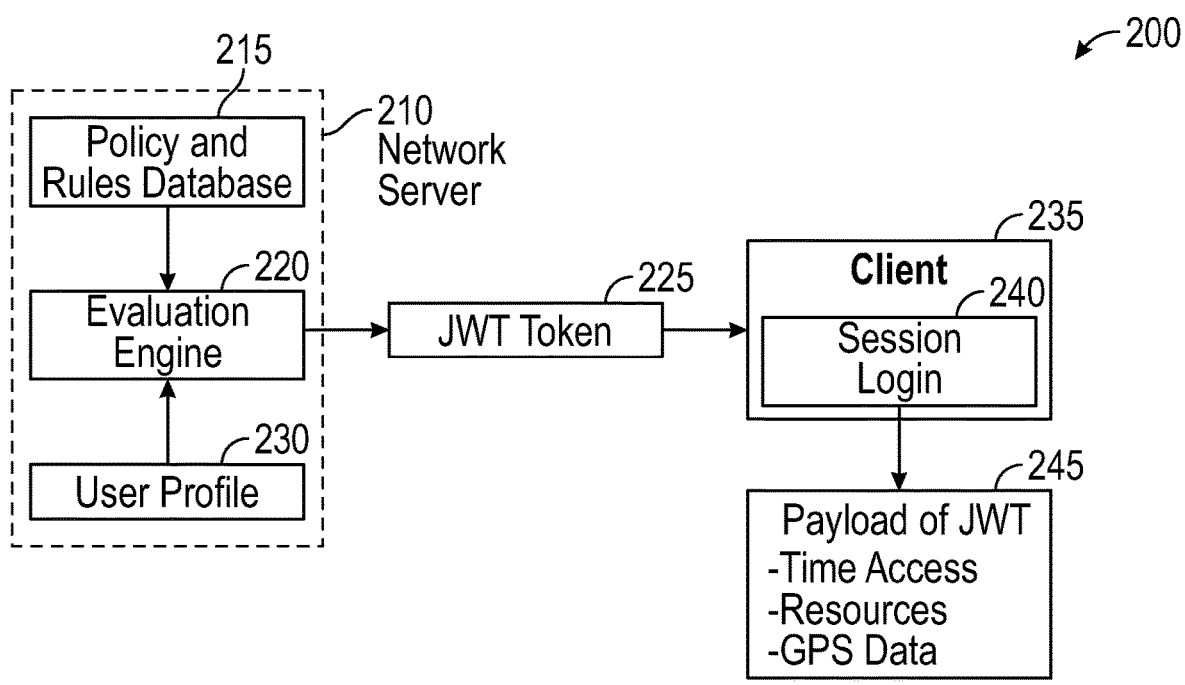
FIG. 2 illustrates an exemplary flow diagram of an evaluation engine implemented a network of a JWT user access system in accordance with an embodiment.

FIG. 2 is an exemplary diagram configuration of an evaluation engine at the network server for configuring JSON payload information in the JWT sent to the client in accordance with an embodiment.

The evaluation engine 220 at the network server 210 can be programmed to have the capability to understand the semantics of the content and/or payload data that is sent via the JWT (token) to the client 235. The network server 210 may incorporate an policy and rules database 215 or can be configured in communication with the policy and rules database 215, where the policy and rules database is a separate entity accessible by multiple networks in a multi-tenant environment. Further, the evaluation engine 220 can be programmed with instructions to apply queries that are based on policies and rules received from the policy and rules database 215. The evaluation engine 220 can also evaluate the policy and rules from the policy and rules database 215 by comparisons, by various application solutions, to compare the rules with data contained in a user profile 230 associated with a user logging into the client 235 for the temporary session 240. The data of the user profile 230 may also be associated with the request sent by the user when logging into the temporary session 240. The JWT 225 has a payload that is encrypted and is decrypted by the client 235. The client 235 receives key information that enables the client to determine the decryption algorithm to unlock the payload data from the JWT 225. The JSON payload 245 of the JWT can be configured in a series of blocks, fields, sections, etc.. to include metadata about how long the JWT is active, which resources the user is permitted to access, and what level of read/write type functionality is enabled in the temporary session. Additionally, the JSON payload 245 may include network parameters such as GPS data of the user's mobile device for enabling the client to send requests to determine the user's location. The client 235 can further using rule data found in the JWT 225 that can enable user access or not, what actions and data can be displayed at the client for viewing, and policy-based rules for resource and data access throughout the network.

In various exemplary embodiments, the evaluation engine 220 at the network server 210, may configure data in a JSON payload of the JWT 225 to pass to the client via a JSON schema programmed based on a set of rules for data usage contained in the policy and rules database 215. The JSON schema may also define the fields and data items for each of those fields of the JSON payload 245 for use to configure network access by the client 235. The evaluation engine 220 may also reduce or increase data and resource limitations at the network server 210 in information in the JSON payload 245 by the JSON schema created formulated on policies stored at a policy database in communication with the network server 210.

In various exemplary embodiments, the JSON payload 245 may include information passing via the JWT 225 to the client 235 of metadata to access GPS data for the user and to determine whether the use is in the vicinity of the client 235 or outside the vicinity of the client 235. This information can be used by the client 235 to configure access to the network server based on GPS data of the user wherein the user's GPS data is processed by the network server to limit user access when the user is within the vicinity of the client.

In various exemplary embodiments, the JSON payload 245 can be formulated using the JSON schema as a composite payload based on multiple JSON payloads to be obtained at the client 235. The composite payload may include the fields and the respective data items for the fields of multiple types of JSON payloads 245 created by a JSON schema. The JSON schema can also document API endpoints in the composite payload.

Figure 3:
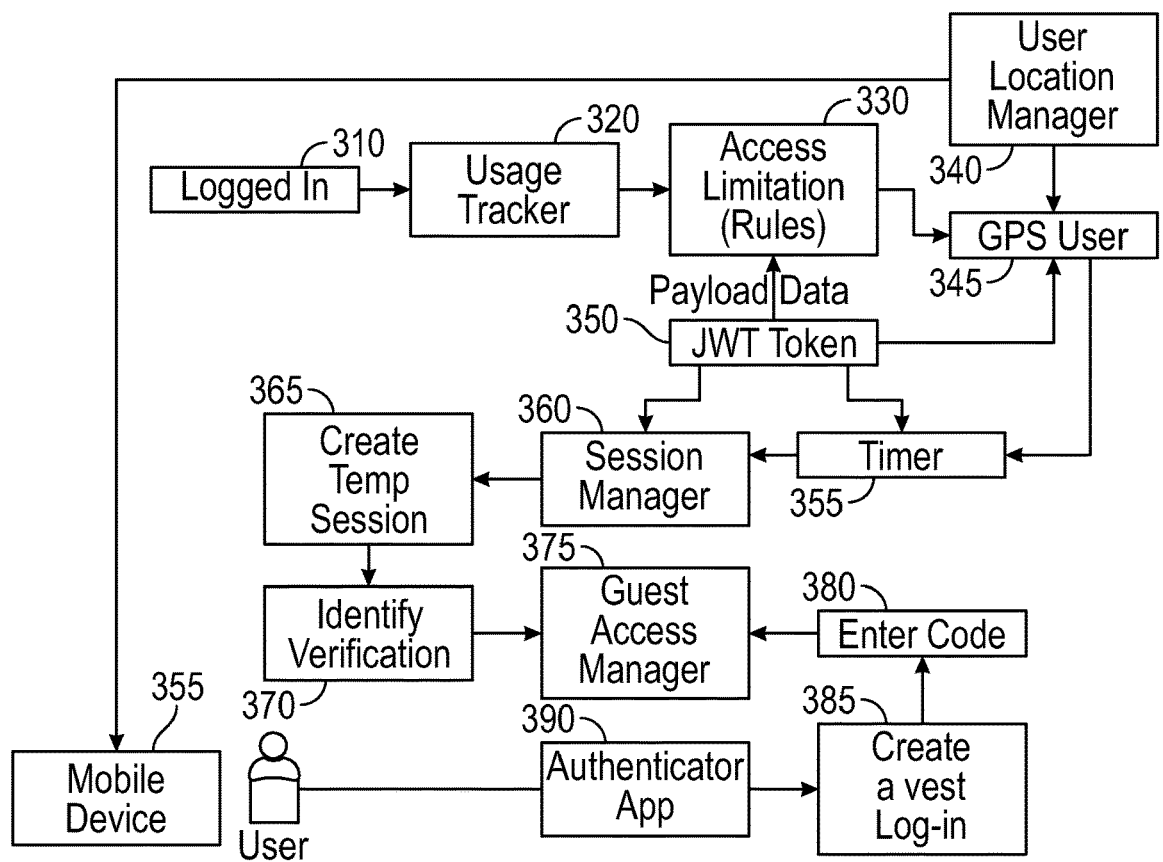
FIG. 3 illustrates an exemplary flow diagram of a user case implemented in a network using the JWT user access system in accordance with an embodiment.

FIG. 3 illustrates an exemplary flow diagram of a user case implemented in a network using the JWT user access system in accordance with an embodiment. In the use case flow diagram 300 shows a scenario of a user logging in at a remote location via an app on a display device to connect to a network. In FIG. 3, the user logs in at step 310 but requires an access code for the app. The user executes an authentication app 390 located on the user's mobile device 335 that creates a guest log-in 385. The user then enters a code 380 for the guest access manager 375. The guest access manager 375 receives input from the identity verification module 370 to grant access to the user to the app. Once the user is logged in at 310, a usage module 320 tracks the user's usage of the app and the products and resources of the SaaS product that the user is accessing via the app. The user access is limited via an access limitation module 330 that determines access limitations based on payload metadata from a JWT 350 that resides at the client. The payload of the JWT includes data of access limitations, as well as network access data to enable the client to get the user's location data of the user's mobile device 335. Based on the rules of the access limitation module 330, the user's access is determined based on the user in a certain location. If the user is outside a certain location, then the user access may be limited. Further, if the user is outside a certain location, a timer 355 may be actuated, for setting a certain limit of time for the temporary session 365 that has been created in which the user is logged in 310. Additionally, timer 355 may be configured based on the settings of metadata in the payload of the JWT 350. The session manager 360 may also receive data from the payload for creating the temporary session. For example, the temporary session 365 may be created as a read-only session or may enable read/write functionality.

Figure 4:
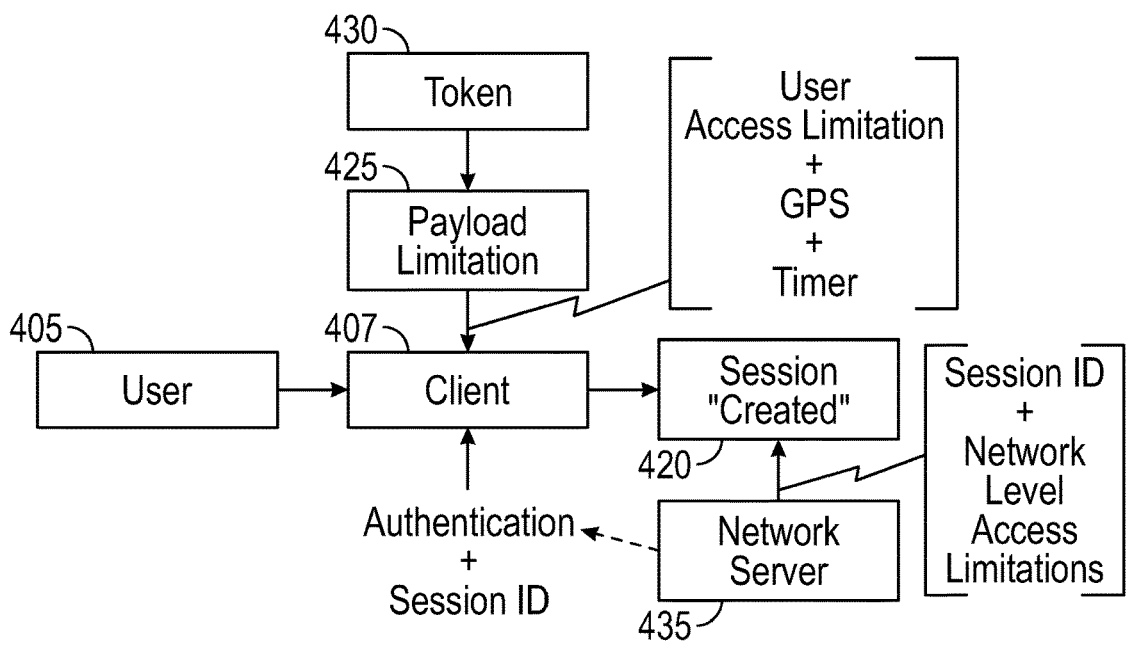
FIG. 4 illustrates an exemplary diagram of a session created in a use case implemented with the JWT user access system in accordance with an embodiment

FIG. 4 illustrates a session created by the access manager with limitations from the server and token payload in accordance with an exemplary embodiment. In FIG. 4, the session 420 created with a session ID from the server 435 for the user 405 after the user logs in. The session id is then stored on a cookie as an example on a user's client (i.e., the user's browser). In an exemplary embodiment, the JSON Web Token (JWT) 430 is used for authentication of the user 405. The server 435 creates the JWT with an authentication key and sends the JWT to the client 407. The client 407 stores the JWT locally and includes the JWT in the header with every request. The server 435 validates the JWT with every request from the client 407 and sends a response. While the user 405 stays logged in, the cookie would be sent along with every subsequent request too. The server 435 in an exemplary embodiment can compare the session id stored on the cookie against the session information stored in the memory at the server 435 to verify the user's identity and sends a response with the corresponding state. Only the necessary information is included in JWT, and sensitive information is omitted to prevent security attacks. The client 407 sends requests to the server 435 for access. The session ID stored at the client 407 is linked to the session ID created by the server 435. The token 430 is a structured format (such as a JSON web token) configured with a payload 425 that sets limitations for session 420 access, including GPS and user-level access limitations. Additionally, the server 435 sets network-level access limitation based on policy and other network-level security documentations. The JWT may be passed to other users for access to session 420.

Figure 5:
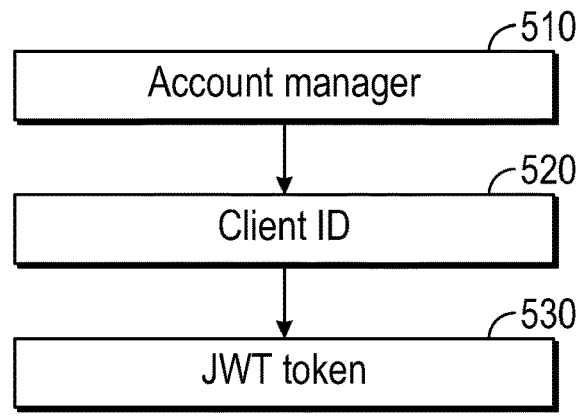
FIG. 5 illustrates an exemplary diagram of an account manager in a use case implemented with the JWT user access system in accordance with an embodiment.

In FIG. 5, in an exemplary embodiment, at a network server, an account manager 510 provides a client ID that is known in a SaaS environment and for a client app. The client ID (logging in ID) 520 can be used to request an authentication JWT token 530. In addition to obtaining the authentication token, the client ID can create interface APIs to grant client app access. The authentication steps to use the JWT token require the client app to request a JWT token using a resource in which the user is authorized. In the request for the JWT token using the resource, the client ID is specified as a URL or header parameter. The user is specified as a guest to request the JWT, and a credential is associated with the user. In an exemplary embodiment, when specifying a type of session to request a JWT for a guest user, there can also be included valid dwsid and dwsecure-token cookies. If the request succeeds, the response includes a JWT in the Authentication: Bearer response header. The response also includes a description of the user in the response body. The application can include the JWT in the Authentication: Bearer header of subsequent requests. The JWT is signed. The signature indicates that the JWT's header and payload sections are JSON-formatted strings. The client can therefore read the various claims in the JSON payload section, such as exp (the token expiration-time) and iat (the token issued-at-time). For example, a JWT may be configured with a lifetime of a time period of 60 minutes. Before the token expires, it must be exchanged for a new token to extend the total lifetime. The JSON Web Token specification stipulates that a JWT contains three sections in the following order: The header section specifies the token type and algorithm used. The payload section contains customer information, the client id, and issue and expiration time. The signature section records the token signature. The network server returns the JWT as a Base 64-encoded string. In a particular string, the header, payload, and signature sections are delimited by periods(.). In an exemplary example, the payload section can be decoded to access the values of the exp, iat, sub, and iss claims, etc.

Figure 6:
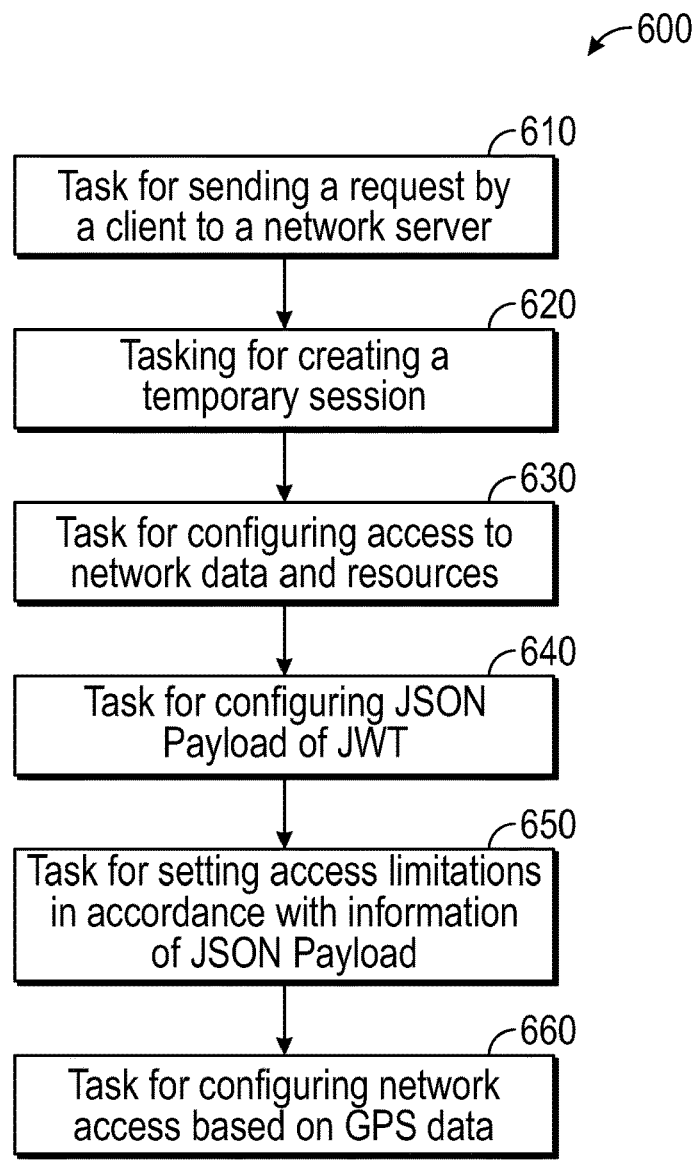
FIG. 6 illustrates an exemplary flowchart of implementing the JWT user access system in accordance with an embodiment.

FIG. 6 is an exemplary flowchart of implementing the JWT user access system in accordance with an embodiment. The method 600, illustrated in FIG. 6, at task 610, is initiated by a user log-in to the app to access a network or platform that contains various data and resources. A passwordless access may also be configured in the initial process for security where the user may enter a code received by a mobile device to log-in to the app on a display device that the user is within the vicinity of and is using. The local client, upon receiving the user request, sends a request to the network server to create a temporary session to enable user access to the network resources and data. At task 620, in response to the initial request, the network server sends or passes a JSON web token (JWT) that formulates the temporary session and enables the network access on the part of the user. The response to creating the temporary session by the network server is configured by data stored in the JSON Web Token (JWT), which is passed to the local client and stored at the local client.

At task 630, the local browser or client decodes using an algorithm identified by the header of the JWT the JSON payload to configure a set of limitations associated with access to various network resources and data by the user in the temporary session.

At task 640, the JSON payload is created by a JSON schema at the network server to pass to the client for storage at the client. In an exemplary embodiment, the evaluation engine may be configured to implement JSON schema that formulates the JSON payload taking into account policies and rules of the network stored at a policy and rules database. In addition, profile data that is stored on the network and associated with the user logging in can be used to configure information stored in the JSON payload. Also the JSON schema may create a composite payload putting together multiple JSON payloads that can be obtained at the client. In the case of the composite payload, the fields and the respective data items for the fields in the multiple JSON payloads are generated by the JSON schema that also documents the API endpoint.

At task 650, the client based on information in the JSON payload, can set access limitations in the temporary session. For example, in the temporary session, the kind of data and resources that the user can access can be configured in a manner to put limitations on the data viewed at a remote location and the resources the user can have access to using a public or semi-public display. Additionally, metadata obtained in the payload may configure the browser or client in an incognito mode to prevent the storage of cookies and password data.

At task 660, access in the temporary session can be changed based on data on the location of the user. For example, the user's mobile smart device that receives a code for log-in via a text or the like can also enable the network server to gather GPS data of the user location and the location of the display device that is used (i.e., the app or client used for the user log-in app). If the user were to leave the vicinity of the display device, the network server could be configured with a solution to receive a notification and to change the user access immediately or after a time delay. Further, the network server may also be configured to send automatically another JWT to reconfigure the temporary session with time metadata or to reconfigure the data viewable and resources accessible in the temporary session. Hence, the GPS data of the user and the location data of the user log-in can be used to increase or reduce network access as desired to enhance security. Also, in a multi-tenant environment, the GPS data can be used to enable or disable various tenant access in the temporary session.

Figure 7:
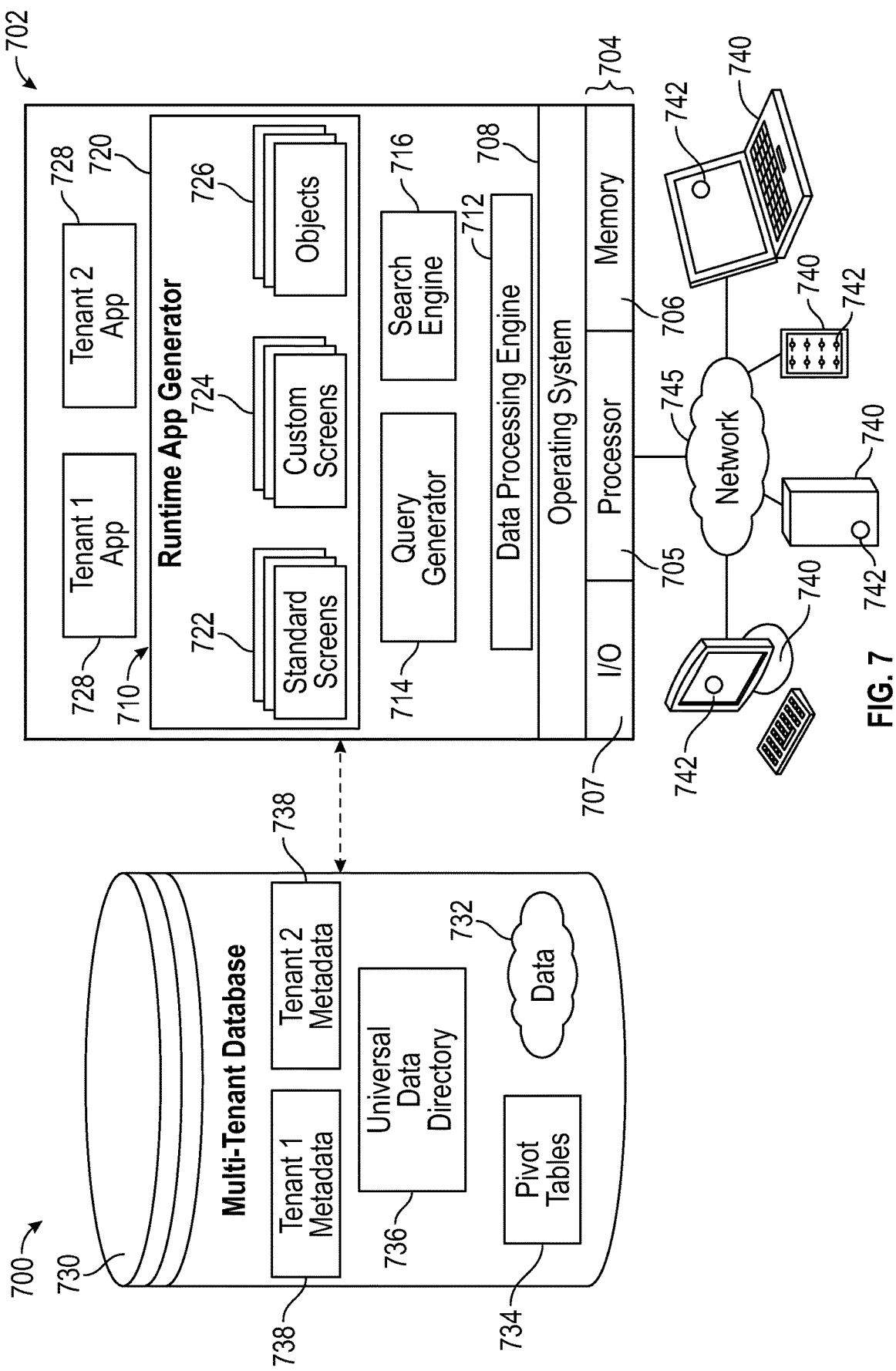
FIG. 7 illustrates a schematic block diagram of an example of a multi-tenant computing environment in which features of the disclosed embodiments can be implemented in accordance with the disclosed embodiments.

FIG. 7 is a schematic block diagram of an example of a multi-tenant computing environment in which features of the disclosed embodiments can be implemented in accordance with the disclosed embodiments. As shown in FIG. 7, an exemplary cloud-based solution may be implemented in the context of a multi-tenant system 700, including a server 702 that supports applications 728 based upon data 732 from a database 730 that may be shared between multiple tenants, organizations, or enterprises, referred to herein as a multi-tenant database. The multi-tenant system 700 can be shared by many different organizations and handles the storage of, and access to, different metadata, objects, data, and applications across disparate organizations. In one embodiment, the multi-tenant system 700 can be part of a database system, such as a multi-tenant database system.

The multi-tenant system 700 can provide applications and services and store data for any number of organizations. Each organization is a source of metadata and data associated with that metadata that collectively make up an application. In one implementation, the metadata can include customized content of the organization (e.g., customizations done to an instance that defines business logic and processes for an organization). Some non-limiting examples of metadata can include, for example, customized content that describes a build and functionality of objects (or tables), tabs, fields (or columns), permissions, classes, pages (e.g., Apex pages), triggers, controllers, sites, communities, workflow rules, automation rules, and processes, etc. Data is associated with metadata to create an application. Data can be stored as one or more objects, where each object holds particular records for an organization. As such, data can include records (or user content) that are held by one or more objects.

The multi-tenant system 700 allows users of user systems 740 to establish a communicative connection to the multi-tenant system 700 over a network 745, such as the Internet or any type of network described herein. Based on a user's interaction with a user system 740, the application platform 710 accesses an organization's data (e.g., records held by an object) and metadata that is stored at one or more database systems 730, and provides the user system 740 with access to applications based on that data and metadata. These applications are executed or run in a process space of the application platform 710 will be described in greater detail below. The user system 740 and various other user systems (not illustrated) can interact with the applications provided by the multi-tenant system 700. The multi-tenant system 700 is configured to handle requests for any user associated with any organization that is a tenant of the system. Data and services generated by the various applications 728 are provided via a network 745 to any number of user systems 740, such as desktops, laptops, tablets, smartphones or other client devices, Google Glass™, and any other computing device implemented in an automobile, aircraft, television, or other business or consumer electronic device or system, including web clients.

Each application 728 is suitably generated at runtime (or on-demand) using a common application platform 710 that securely provides access to the data 732 in the database 730 for each of the various tenant organizations subscribing to the system 700. The application platform 710 has access to one or more database systems 730 that store information (e.g., data and metadata) for a number of different organizations, including user information, organization information, custom information, etc. The database systems 730 can include a multi-tenant database system 730 as described with reference to FIG. 7, as well as other databases or sources of information that are external to the multi-tenant database system 730 of FIG. 7. In accordance with one non-limiting example, the service cloud 700 is implemented in the form of an on-demand multi-tenant customer relationship management (CRM) system that can support any number of authenticated users for a plurality of tenants.

As used herein, a "tenant" or an "organization" should be understood as referring to a group of one or more users (typically employees) that share access to a common subset of the data within the multi-tenant database 730. In this regard, each tenant includes one or more users and/or groups associated with, authorized by, or otherwise belonging to that respective tenant. Stated another way, each respective user within the multi-tenant system 700 is associated with, assigned to, or otherwise belongs to a particular one of the plurality of enterprises supported by the system 700.

Each enterprise tenant may represent a company, corporate department, business or legal organization, and/or any other entities that maintain data for particular sets of users (such as their respective employees or customers) within the multi-tenant system 700. Although multiple tenants may share access to the server 702 and the database 730, the particular data and services provided from the server 702 to each tenant can be securely isolated from those provided to other tenants. The multi-tenant architecture, therefore, allows different sets of users to share functionality and hardware resources without necessarily sharing any of the data 732 belonging to or otherwise associated with other organizations.

The multi-tenant database 730 may be a repository or other data storage system capable of storing and managing the data 732 associated with any number of tenant organizations. Database 730 may be implemented using conventional database server hardware. In various embodiments, the database 730 shares processing hardware 704 with the server 702. In other embodiments, the database 730 is implemented using separate physical and/or virtual database server hardware that communicates with the server 702 to perform the various functions described herein.

In an exemplary embodiment, the database 730 includes a database management system or other equivalent software capable of determining an optimal query plan for retrieving and providing a particular subset of the data 732 to an instance of an application (or virtual application) 728 in response to a query initiated or otherwise provided by an application 728, as described in greater detail below. The multi-tenant database 730 may alternatively be referred to herein as an on-demand database, in that the database 730 provides (or is available to provide) data at runtime to on-demand virtual applications 728 generated by the application platform 710, as described in greater detail below.

In practice, the data 732 may be organized and formatted in any manner to support the application platform 710. In various embodiments, the data 732 is suitably organized into a relatively small number of large data tables to maintain a semi-amorphous "heap"-type format. The data 732 can then be organized as needed for a particular virtual application in 728. In various embodiments, conventional data relationships are established using any number of pivot tables 734 that establish indexing, uniqueness, relationships between entities, and/or other aspects of conventional database organization as desired. Further data manipulation and report formatting are generally performed at runtime using a variety of metadata constructs. Metadata within a universal data directory (UDD) 736, for example, can be used to describe any number of forms, reports, workflows, user access privileges, business logic and other constructs that are common to multiple tenants.

Tenant-specific formatting, functions and other constructs may be maintained as tenant-specific metadata 738 for each tenant, as desired. Rather than forcing the data 732 into an inflexible global structure that is common to all tenants and applications, the database 730 is organized to be relatively amorphous, with the pivot tables 734 and the metadata 738 providing additional structure on an as-needed basis. To that end, the application platform 710 suitably uses the pivot tables 734 and/or the metadata 738 to generate "virtual" components of the virtual applications 728 to logically obtain, process, and present the relatively amorphous data 732 from the database 730.

The server 702 may be implemented using one or more actual and/or virtual computing systems that collectively provide the dynamic application platform 710 for generating the virtual applications 728. For example, the server 702 may be implemented using a cluster of actual and/or virtual servers operating in conjunction with each other, typically in association with conventional network communications, cluster management, load balancing and other features as appropriate. The server 702 operates with any sort of conventional processing hardware 704, such as a processor 705, memory 706, input/output features 707 and the like. The input/output features 707 generally represent the interface(s) to networks (e.g., to the network 745, or any other local area, wide area or other networks), mass storage, display devices, data entry devices and/or the like.

The processor 705 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 706 represents any non-transitory short or long term storage or other computer-readable media capable of storing programming instructions for execution on the processor 705, including any sort of random access memory (RAM), read-only memory (ROM), flash memory, magnetic or optical mass storage, and/or the like. The computer-executable programming instructions, when read and executed by the server 702 and/or processor 705, cause the server 702 and/or processor 705 to create, generate, or otherwise facilitate the application platform 710 and/or virtual applications 728 and perform one or more additional tasks, operations, functions, and/or processes described herein. It should be noted that the memory 706 represents one suitable implementation of such computer-readable media, and alternatively or additionally, the server 702 could receive and cooperate with external computer-readable media that is realized as a portable or mobile component or platform, e.g., a portable hard drive, a USB flash drive, an optical disc, or the like.

The server 702, application platform 710 and database systems 730 can be part of one backend system. Although not illustrated, the multi-tenant system 700 can include other backend systems that can include one or more servers that work in conjunction with one or more databases and/or data processing components, and the application platform 710 can access the other backend systems.

The multi-tenant system 700 includes one or more user systems 740 that can access various applications provided by the application platform 710. The application platform 710 is a cloud-based user interface. The application platform 710 can be any sort of software application or other data processing engine that generates the virtual applications 728 that provide data and/or services to the user systems 740. In a typical embodiment, the application platform 710 gains access to processing resources, communications interfaces and other features of the processing hardware 704 using any sort of conventional or proprietary operating system 708. The virtual applications 728 are typically generated at runtime in response to input received from the user systems 740. For the illustrated embodiment, the application platform 710 includes a bulk data processing engine 712, a query generator 714, a search engine 716 that provides text indexing and other search functionality, and a runtime application generator 720. Each of these features may be implemented as a separate process or other modules, and many equivalent embodiments could include different and/or additional features, components or other modules as desired.

The runtime application generator 720 dynamically builds and executes the virtual applications 728 in response to specific requests received from the user systems 740. The virtual applications 728 are typically constructed in accordance with the tenant-specific metadata 738, which describes the particular tables, reports, interfaces and/or other features of the particular application 728. In various embodiments, each virtual application 728 generates dynamic web content that can be served to a browser or other client program 742 associated with its user system 740, as appropriate.

The runtime application generator 720 suitably interacts with the query generator 714 to efficiently obtain multi-tenant data 732 from the database 730 as needed in response to input queries initiated or otherwise provided by users of the user systems 740. In a typical embodiment, the query generator 714 considers the identity of the user requesting a particular function (along with the user's associated tenant), and then builds and executes queries to the database 730 using system-wide metadata 736, tenant-specific metadata 738, pivot tables 734, and/or any other available resources. The query generator 714 in this example, therefore, maintains security of the common database 730 by ensuring that queries are consistent with access privileges granted to the user and/or tenant that initiated the request.

With continued reference to FIG. 7, the data processing engine 712 performs bulk processing operations on the data 732, such as uploads or downloads, updates, online transaction processing, and/or the like. In many embodiments, less urgent bulk processing of the data 732 can be scheduled to occur as processing resources become available, thereby giving priority to more urgent data processing by the query generator 714, the search engine 716, the virtual applications 728, etc.

In exemplary embodiments, the application platform 710 is utilized to create and/or generate data-driven virtual applications 728 for the tenants that they support. Such virtual applications 728 may make use of interface features such as custom (or tenant-specific) screens 724, standard (or universal) screens 722 or the like. Any number of custom and/or standard objects 726 may also be available for integration into tenant-developed virtual applications 728. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system.

The data 732 associated with each virtual application 728 is provided to the database 730, as appropriate, and stored until it is requested or is otherwise needed, along with the metadata 738 that describes the particular features (e.g., reports, tables, functions, objects, fields, formulas, code, etc.) of that particular virtual application 728. For example, a virtual application 728 may include a number of objects 726 accessible to a tenant, wherein for each object 726 accessible to the tenant, information pertaining to its object type along with values for various fields associated with that respective object type are maintained as metadata 738 in the database 730. In this regard, the object type defines the structure (e.g., the formatting, functions, and other constructs) of each respective object 726 and the various fields associated therewith.

In exemplary embodiments, the web token may be cached, be part of a multi-tenant database, be accessible by another resource on a cloud network, and/or may be stored locally or in a separate cloud or network database.

Still referring to FIG. 7, the data and services provided by the server 702 can be retrieved using any sort of personal computer, mobile telephone, tablet, or other network-enabled user systems 740 on the network 745. In an exemplary embodiment, the user system 740 includes a display device, such as a monitor, screen, or another conventional electronic display capable of graphically presenting data and/or information retrieved from the multi-tenant database 730, as described in greater detail below.

Typically, the user operates a conventional browser application or other client programs 742 executed by the user system 740 to contact the server 702 via the network 745 using a networking protocol, such as the hypertext transport protocol (HTTP) or the like. The user typically authenticates his or her identity to the server 702 to obtain a session identifier ("SessionID") that identifies the user in subsequent communications with the server 702. When the identified user requests access to a virtual application 728, the runtime application generator 720 suitably creates the application at run time based upon the metadata 738, as appropriate. However, if a user chooses to manually upload an updated file (through either the web-based user interface or through an API), it will also be shared automatically with all of the users/devices that are designated for sharing.

As noted above, the virtual application 728 may contain Java, ActiveX, or other content that can be presented using conventional client software running on the user system 740;

other embodiments may simply provide dynamic web or other content that can be presented and viewed by the user, as desired. As described in greater detail below, the query generator 714 suitably obtains the requested subsets of data 732 from the database 730 as needed to populate the tables, reports, or other features of the particular virtual application 728.

In various exemplary embodiments, a method is provided for formulating access limitations to a network in a session using a formatted web token. The method includes creating a web token by a schema of a network server to generate a formatted web token to a client for user access to the network, and receiving a log-in request for the user access to the network server via an app hosted by a computing device remotely located to the network server. In response to receipt of a user access request, the method includes creating the session by the network server with network limitations for user access to data and resources of the network and passing the formatted web token to a client at the computing device, for hosting at the client and for enabling user access to the data and resources of the network. Further, the method includes decoding payload data of the formatted web token at the client to authenticate the user access; and enabling the client with one or more access limitations based on decoded payload data contained in the formatted web token wherein the one or more access limitations of the client are based on policy documentation of the network for remote access to the network.

In various exemplary embodiments, a method is provided for formulating access limitations to a network in a session using a formatted web token. The method includes sending a log-in request to a network server via an app hosted by a computing device remotely located to the network server wherein the app is in communication via a cloud platform with the network. In response to receipt of the user log-in request, the method includes creating the session by the network server for user access to data and resources of the network. Further, the method includes configuring a plurality of access limitations for the user access to the data and resources of the network by passing a formatted web token to a client at the computing device to instruct the client to enable one or more access limitations that are consistent with at least policy documentation of the network for remote access to the network, and enabling at least one access limitation based on data decoded from a payload of the formatted web token passed to the client. The access limitations of the formatted web token payload's data is formulated by a schema created in order to apply restrictions to data and resources of the network in a manner that conforms with the policy documentation of the network.

In various exemplary embodiments, the method includes configuring by an evaluation engine at the network server, data of a formatted web token payload via the schema to direct a set of rules for data usage by the client wherein data usage rules are based on policies stored at a policy database in communication with the network server. The method also includes configuring a set of limitations to access data and resources contained at the network server by the client based on metadata derived from the formatted web token payload wherein the metadata is configured in the formatted web token payload by the schema implemented at the network server. The method includes configuring access by the client to the network server based on GPS data of a user wherein a user's GPS data is processed by the network server to limit user access when the user is within a vicinity of the client.

The method includes configuring access by the client to the network server based on GPS data of the user to enable a limited period of access when the user is physically outside a vicinity of the client. The method includes configuring access by the client to network data based on evaluation results by evaluations of a network server of comparisons of a set of policy rules for data access in conjunction with profile data of the user. The method includes configuring access by the client to reduce an available set of network resources based on a set of rules set forth in a policy database in communication with the network server. The method includes sharing a same web token amongst a set of clients without having to make a new request by each client to the network server for another web token for network access of a different client amongst the set of clients. The formatted web token, is a structured web token comprising a JavaScript Object Notation (JSON) Web Token (JWT).

The following description is one example of a system in which the features described above may be implemented. The components of the system described below are merely one example and should not be construed as limiting. The features described above with respect to FIGS. 1-7 may be implemented in any other type of computing environment, such as one with multiple servers, one with a single server, a multi-tenant server environment, a single-tenant server environment, or some combination of the above.

The preceding description sets forth numerous specific details, such as examples of specific systems, components, methods, and so forth in order to provide a good understanding of several embodiments of the present invention. It will be apparent to one skilled in the art, however, that at least some embodiments of the present invention may be practiced without these specific details. In other instances, well-known components or methods are not described in detail or are presented in a simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for formulating access limitations to a network server in a session, the method comprising:
   receiving a log-in request for user access to the network server from a client computing device remotely located to the network server;
   in response to receipt of the log-in request, creating the session by the network server with one or more access limitations for user access to data and resources of the network server, wherein the one or more access limitations are based on policy documentation for remote access to the network server;
   creating a web token associated with the session by a schema of the network server to generate a formatted web token for the user access to the data and resources of the network server, wherein the formatted web token includes metadata corresponding to the one or more access limitations;
   passing the formatted web token to the client computing device, for hosting at the client computing device, wherein the client computing device decodes payload data of the formatted web token at the client computing device to configure the one or more access limitations associated with the user access based on the metadata; and
   when the formatted web token sent with a request from the client computing device is validated, enabling the user access to the data and resources of the network server at the client computing device with the one or more access limitations based on the metadata of the decoded payload data contained in the formatted web token.

2. The method of claim 1, further comprising:
   configuring by an evaluation engine at the network server, data of a formatted web token payload via the schema to direct a set of rules for data usage by the client computing device wherein data usage rules are based on policies stored at a policy database in communication with the network server.

3. The method of claim 1, further comprising:
   sharing a same web token amongst a set of clients without having to make a new request by each client to the network server for another web token for network access of a different client amongst the set of clients.

4. The method of claim 1, wherein the formatted web token, is a structured web token comprising a JavaScript Object Notation (JSON) Web Token (JWT).

5. The method of claim 1, wherein the client computing device configures a browser in an incognito mode to prevent storage of at least one of cookies and password data based on the metadata.

6. The method of claim 1, wherein a client app at the client computing device is configurable to prevent storage of at least one of cookies and password data based on the metadata.

7. The method of claim 1, further comprising reconfiguring the session by the network server based on a location of a mobile device.

8. The method of claim 7, wherein reconfiguring the session comprises the network server automatically sending another formatted web token to the client computing device to reconfigure the user access to the data and resources of the network server.

9. The method of claim 1, wherein the metadata includes at least one of:
   first metadata about how long the formatted web token is active;
   second metadata about which of the resources of the network server a user is permitted to access; and
   third metadata about what level of read/write functionality is enabled in the session.

10. The method of claim 1, wherein the formatted web token includes location data of a mobile device of a user for enabling the client computing device to send requests to determine a location of the user.

11. A non-transitory machine-readable storage medium that provides instructions configurable such that, when executed by a processor, the instructions cause the processor to perform operations comprising:
    receiving a log-in request for user access to a network server from a client computing device remotely located to the network server;
    in response to receipt of the log-in request, creating a session by the network server with one or more access limitations for user access to data and resources of the network server, wherein the one or more access limitations are based on policy documentation for remote access to the network server;

creating a web token associated with the session by a schema of the network server to generate a formatted web token for the user access to the data and resources of the network server, wherein the formatted web token includes metadata corresponding to the one or more access limitations;

passing the formatted web token to the client computing device, for hosting at the client computing device, wherein the client computing device decodes payload data of the formatted web token at the client computing device to configure the one or more access limitations associated with the user access based on the metadata; and when the formatted web token sent with a request from the client computing device is validated, enabling the user access to the data and resources of the network server at the client computing device with the one or more access limitations based on the metadata of the decoded payload data contained in the formatted web token.

12. The non-transitory machine-readable storage medium of claim 11, the operations further comprising:
configuring by an evaluation engine at the network server, the data of a web token's payload by a set of rules based on policies stored at the network server.

13. The non-transitory machine-readable storage medium of claim 11, the operations further comprising:
configuring access by the client computing device to the network server based on Global Positioning System (GPS data of a user wherein a user's GPS data is processed by the network server to limit user access when the user is within a vicinity of the client computing device.

14. The non-transitory machine-readable storage medium of claim 11, the operations further comprising:
configuring access by the client computing device to the network server based on Global Positioning System (GPS) data of a user for a limited period of access when the user outside a vicinity of the client computing device.

15. The non-transitory machine-readable storage medium of claim 11, the operations further comprising:
configuring access by the client computing device to network data based on evaluation results by evaluations of the network server of comparisons of a set of policy rules for data access in conjunction with profile data of a user.

16. The non-transitory machine-readable storage medium of claim 11, the operations further comprising:
configuring access by the client computing device to a reduced set of network resources based on a set of rules stored in a policy database in communication with the network server.

17. The non-transitory machine-readable storage medium of claim 11, the operations further comprising:
obtaining a plurality of web token payloads wherein each of the plurality of web token payloads includes a set of one or more fields and a data item for each of those fields for use to configure network access of the client computing device.

18. The non-transitory machine-readable storage medium of claim 17, the operations further comprising:
sharing a same web token amongst a set of clients without having to make a new request by each client to the network server for another web token for network access of a different client amongst the set of clients.

19. An apparatus comprising:
a processor and a non-transitory machine-readable storage medium that provides instructions that, when executed by the processor, cause the processor to perform operations comprising:

receiving a log-in request for user access to a network server from a client computing device remotely located to the network server;

in response to receipt of the log-in request, creating a session by the network server with one or more access limitations for user access to data and resources of the network server, wherein the one or more access limitations are based on policy documentation for remote access to the network server;

creating a web token associated with the session by a schema of the network server to generate a formatted web token for the user access to the data and resources of the network server, wherein the formatted web token includes metadata corresponding to the one or more access limitations;

passing the formatted web token to the client computing device, for hosting at the client computing device, wherein the client computing device decodes payload data of the formatted web token at the client computing device to configure the one or more access limitations associated with the user access based on the metadata; and when the formatted web token sent with a request from the client computing device is validated, enabling the user access to the data and resources of the network server at the client computing device with the one or more access limitations based on the metadata of the decoded payload data contained in the formatted web token.

* * * * *